United States Patent [19]

Poole

[11] Patent Number: 4,867,835
[45] Date of Patent: Sep. 19, 1989

[54] WATERSTOP SPLICING METHOD AND APPARATUS

[76] Inventor: William J. Poole, 254 Monterey, San Clemente, Calif. 92672

[21] Appl. No.: 5,579

[22] Filed: Jan. 15, 1987

[51] Int. Cl.$^4$ .................... B29C 65/20; B30B 15/04
[52] U.S. Cl. .................. 156/507; 156/304.2; 156/304.6; 156/499
[58] Field of Search .............. 156/157, 158, 304.2, 156/304.6, 499, 507, 502, 304.1

[56] References Cited

U.S. PATENT DOCUMENTS

| | | | |
|---|---|---|---|
| 2,379,500 | 7/1945 | Steffens | 156/267 |
| 2,384,014 | 9/1945 | Cutter | 156/499 |
| 2,665,738 | 1/1954 | Caskin | 156/304.6 |
| 3,013,925 | 12/1961 | Larsen | 156/503 |
| 3,143,454 | 8/1964 | Hannon | 156/499 |
| 3,391,045 | 7/1968 | Mojonnier et al. | 156/304.2 |
| 3,400,030 | 9/1968 | Burger | 156/153 |
| 3,586,584 | 6/1971 | Wilkins | 156/504 |
| 3,793,120 | 2/1974 | Spadano | 156/499 |
| 3,897,296 | 7/1975 | Waldrum | 156/499 |
| 4,173,509 | 11/1979 | Raabe et al. | 156/507 |
| 4,198,196 | 4/1980 | Cilderman et al. | 156/502 |
| 4,505,780 | 3/1985 | Sewards | 156/507 |
| 4,539,064 | 9/1985 | Andruchiu | 156/379.7 |
| 4,781,787 | 11/1988 | Weissfloch et al. | 156/507 |

Primary Examiner—Michael Wityshyn
Attorney, Agent, or Firm—Gausewitz, Carr & Rothenberg

[57] ABSTRACT

A waterstop splicing method and apparatus including a table having first and second coplanar aligned table top surfaces that simultaneously and equally, open and close by mechanical means driven by adjustable compression springs which provide equal forces to both tops. The table is equipped with two identical clamping arm assemblies in proximate relation to the facing edges of the two table surfaces, with one clamping arm assembly for each side, each of the clamping arm assemblies being provided with a bar having slidably and lockably assembled thereon a plurality of clamp devices, which are individually adjustable for pressure, width and cross-section of the waterstop strips for enabling securing of a waterstop to the table at any desired angle without puncturing. A removable recessed channel is provided in the middle of the table for supporting a thermoplastic welding iron having opposing heated parallel surfaces for simultaneously contacting the ends of a pair of aligned strips. The iron is moved along the channel to a point which centrally intersects the adjacent ends of the waterstop, whereupon the ends are brought into contact with the iron which remains stationary until the melting process is complete. Then, the table tops are separated and the iron is moved along the channel out of the way during the welding process. The recessed channel keeps dirt and debris from entering the weld area and allows the excess melted thermoplastic material, when compressed, to uniformly squeeze out of the weld area around the joint forming a void free monolithic weld throughout the web of the waterstop.

18 Claims, 4 Drawing Sheets

WATERSTOP SPLICING METHOD AND APPARATUS

BACKGROUND OF THE INVENTION

The background of the invention will be discussed in two parts.

1. Field of the Invention

This invention relates to apparatus for joining thermoplastic or elastomeric substances, and more particularly to apparatus for joining waterstop strips.

2. Description of the Prior Art

Since the mid 1940s P.V.C. (polyvinylchloride) waterstop extrusions have been used in concrete joints to prevent water seepage or hydrostatic pressure leakage. By way of example, waterstop extrusions are placed in concrete at the junction with an adjacent concrete slab, with the extrusion having portions that are engaged within adjacent slabs and extend in a plane parallel to the surface of the slab. The waterstop extrusions are constructed to provide a high measure of tensile strength and elongation, with elongations of 365% or more under stress being common, that is, the waterstop can stretch to more than three times its original dimension without rupture or failure.

Such waterstop extrusions are used in construction projects where moisture seepage or hydrostatic pressure leakage are of prime consideration, such as in dams, reservoirs, and sewage treatment plants. In such instances it is desirable to provide a high measure of fluid containment protection in the event of soil movement or earthquakes. In an earthquake situation, for example, adjacent concrete slabs may move horizontally or vertically relative to one another, and with such separation, the waterstop extrusion at the joint is the only operative water containment device for preventing loss of the fluid. In sewage treatment plants, the least amount of untreated fluid seepage into the earth causes a potential contamination problem, particularly in those areas in which natural underground reservoirs or aquifers provide potable water. Contaminant seepage into such aquifers have the potential of damaging a very large volume of water. Waterstop extrusions may take varying forms, such as generally planar thermoplastic strips with enlarged longitudinally extending edges, strips with a cruciform cross-section, strips including channels and the like.

The waterstop material is formed in strips of a finite length, and the ends must be suitably bonded to the same degree of structural integrity as the original material to enable the joints to function properly, that is, ideally the welded or splice joint must be monolithic, without voids or contaminating debris therein. Due to the variety of forming applications it is necessary to fabricate and weld this material, in the field, into continuous lengths and directional changes (referred to as fittings). Until now the only method available in he industry to weld P.V.C. waterstop together has been by the use of a thermoplastic welding iron held by hand, which results in a joint which is totally dependent on the ability of the operator to produce a good weld. Unfortunately, this requires training skilled personnel in the use of the iron and relies heavily on individual ability to consistently produce quality fittings.

In the field, the present splicing method employed is the use of a table, on which two pieces of waterstop are placed with the ends to be joined in spaced relation. The two pieces are then manually retained while a heating iron is guided by the upper surface of the table and passed down the center between the two edges to be joined, with the edges manually urged toward the adjacent heated surface of the iron. Any surface debris on the table top is thus guided by the heating iron into the space between the edges, and, oftentimes, debris is embedded into the plastic edges during the heating process. After the edges are observed to be in the semifluid state needed for splicing the iron is removed, and the edges manually urged toward each other to complete the bonding. As the edges are moved toward each other, more debris is forced into the joint, thus producing a weak spot at the joint where foreign materials have been introduced. An additional problem with this manual field method arises as a consequence of the non-planar cross-sections of the majority of the waterstop strips used. It is difficult enough to employ a manual method of splicing thermoplastic strips of regular planar cross-section, but it is extremely difficult to achieve a monolithic joint when the cross-section is cruciform or otherwise irregular, in which event vertical misalignment of the adjacent edges occurs.

As a result of the inconsistency of producing quality fittings in the field, most failures of the product to perform have occurred at the weld area, causing water penetration through the concrete joint. Therefore, welding P.V.C. waterstop has become a major concern of the structural engineer to insure his client of receiving a quality structure.

The problems attendant to hand welding is further exaggerated by the requirement, in most applications, that the waterstop strips be welded or spliced to form flat ells, flat tees, or flat cross shapes. The cross-shaped interconnection is required, for example, at the corners where four concrete slabs meet. To meet this need, factory made fittings are available for purchase, with the ends of the fittings right angularly configured for butt welding to the end of a length of waterstop strip. With such factory fittings, the hand operation in the field is thus limited to butt welding of two right angularly configured ends. However, by use of such fittings, an excess number of weld joints are placed at the intersections, thus increasing the prospect of a poor weld occurring at an intersection, and thus resulting in seepage or failure at a critical point in the water containment system.

Apparatus for joining or welding thermoplastic or elastomeric materials are not, per se, new. However, such apparatus are constructed for use with a single article of a defined configuration in a controlled environment where power of one form or another is readily available. One such apparatus is disclosed in U.S. Pat. No. 2,379,500, entitled "Method of Making Thermoplastic Joints", such patent issuing on July 3, 1945 to Steffens. The apparatus is directed to joining the edges of thermoplastic strips, in a butt joint connection, the apparatus including a clamp device with a fixed clamp and a slidable clamp with the two ends to be butted being received in the two clamps. The ends may then be trued by use of a clamp edge as a cutting guide, after which the strips ar repositioned. A hot steel blade or knife is then positioned between the facing strip edges, whereupon the sliding clamp is moved toward the fixed clamp so that both strip edges come into contact with opposite sides of the blade. Thereafter, the hot blade is withdrawn, and the moving clamp is urged further toward the fixed clamp to cause the plastic ends of the strips to meet and be pressed together s that they will become fused.

U.S. Pat. No. 2,384,014, entitled "Welding Apparatus", issued to Cutter on Sept. 4, 1945, such patent disclosing a device for welding together the ends of thermoplastic pipes, tubes or rods, and discloses a pair of spaced clamp members configured for retaining the adjacent ends to be welded in aligned relation, with a heater interposed between the two ends for heating the ends to a plastic state, after which the heater is withdrawn and the clamps are urged together to urge the ends into engagement. The clamp members are provided with adjustable spring mounting arrangements.

Another apparatus is shown and described in U.S. Pat. No. 2,665,738, entitled "Heat-Sealing Apparatus for Joining Thermoplastic Members", such patent issuing to Caskin on Jan. 12, 1954. The apparatus includes a pair of aligned slides for clamping to the surface thereof opposing pieces to be joined with the ends in aligned relation. A treadle is provided for elevating a heating assembly and simultaneously separating the slides, the heater rising until in facing relation to the opposing ends. A timer controls the heater to permit dropping of the heater assembly after which the heated ends are urged into abutting relation for enabling joinder of the ends.

Another such apparatus is shown and described in U.S. Pat. No. 3,400,030, entitled "Method and Apparatus for Butt-Splicing Elongated Elastomeric Articles", which patent issued to Burger on Sept. 3, 1968. The method and apparatus are directed to butt splicing vulcanized elastomeric articles by compressing and deforming the aligned end portions, and removing an end portion of each while under stress so that when the end portions are bonded together the finished article will have a joint with residual stresses, which strengthen the joint.

An apparatus for welding together plastic sheets is disclosed in U.S. Pat. No. 3,793,120, which issued to Spadano on Feb. 19, 1974, which patent is entitled "Machine for Heat Sealing Together the Edges of Plastic Sheets and the Like". The patent discloses a table apparatus, in which the top is divided into a first fixed part and a second movable part operated y a cylinder, with each part having clamps extending across a dimension thereof for retaining the two sheets to be bonded together in aligned relation. The clamps are pivotably attached at one end. A heat shoe is actuated upwardly by a cylinder to enable the application of heat to adjacent spaced edges of the sheets, after which the movable table is actuated away from the shoe surface, the shoe drops, and the movable table is actuated toward the stationary part to weld the edges together.

U.S. Pat. No. 3,897,296, entitled "Thermal Welding of Plastic", issued to Waldrum on July 29, 1975, and discloses a method and apparatus in which, after heating juxtaposed surfaces, a portion of the liquified surface is removed to expose unoxidized surfaces therebeneath, which are then brought into abutment with one another for forming a weld joint.

Another joining apparatus is disclosed in U.S. Pat. No. 4,505,780, which issued Mar. 19, 1985 to Sewards for "Joining Weatherstripping", the apparatus including jigs, arranged in pairs, to first cut the weatherstripping with heated knives, and then bond the ends together with an ultrasonic horn member.

U.S. Pat. No. 4,539,064, entitled "Apparatus for Splicing Strips of Thermoplastic Material" issued to Andruchiw et al on Sept. 3, 1985, and is specifically directed to apparatus for splicing strips of material to form waterstops. For this purpose a jig and router is provided for enabling the forming of rebates in the adjacent ends to form a half-lap joint, with a heating element configured to be inserted into the lapped joints for providing heat, the element then remaining in the joint upon cooling. In this apparatus, although other heating means are referred to, a foreign object is deliberately inserted into, and remains within the so-formed joint. The jig employed uses two clamping members which, in facing relation, secure the waterstop therebetween, with the facing surface of the two clamping members being configured to accommodate the cross-section of the waterstop clamped therebetween. For different cross-sections, other clamp configurations would be required.

The majority of the apparatus of the prior art are directed to joining edges of articles of regular cross-sectional configuration, such as rectangular or round. Furthermore, the edges to be bonded or joined by such apparatus are right angularly cut to form a continuous strip, with no provision for beveled or angled edges. In addition, in the majority of such apparatus, a source of electric, air or hydraulic fluid is required, which may be useful in a fixed installation, such as a building or plant having such sources, but such apparatus are not readily usable in the field at remote locations. Waterstop strips may be very long, such as one hundred feet long, and in most instances it is desirable to carry the welding or splicing apparatus to the end of the strip for splicing to another strip, either in alignment therewith or at angles thereto.

It is accordingly an object of the invention to provide a new and improved waterstop splicing apparatus which is readily usable in the field, and can be used for welding or splicing angled edges of waterstop as well as straight edges.

SUMMARY OF THE INVENTION

The foregoing and other objects of the invention are accomplished by providing a waterstop splicing method and apparatus including a table having first and second coplanar aligned table surfaces that simultaneously open and close by mechanical means driven by adjustable compression springs. The table is equipped with two identical clamping arm assemblies in proximate relation to the facing edges of the two table surfaces, with one clamping arm assembly for each side, each of the clamping arm assemblies being provided with a bar having slidably and lockably assembled thereon a plurality of clamp devices, which are individually adjustable for pressure, width and cross-section of the polyvinylchloride waterstop strips for enabling securing of a waterstop to the table at any desired angle without puncturing the waterstop. A removable recessed channel is provided in the middle of the table for supporting a thermoplastic welding iron having opposing heated parallel surfaces for simultaneously contacting the ends of a pair of aligned strips. The iron is moved along the channel to a point which centrally intersects the adjacent ends of the waterstop where it is held stationary as the adjacent edges are brought into contact therewith. After the melting of the edges, the edges are moved away from the heating iron. Then the iron is moved along the channel out of the way, after which the edges are brought into contact during the welding process. While the weld cools, the channel supports the iron so that the operator can clean the heating iron surfaces of melted thermoplastic residue. By adjustment of the spring tension of the compression springs, equal pressure can be provided on both of the aligned table surfaces, and thus on both of the adjacent ends of the pair of strips, for a variety of different strip cross-sections or thicknesses without distorting the shape while melting the polyvinylchloride waterstop strips. The aligned table surfaces are covered with plywood to provide a non-conductive nailable surface when needed for attaching shim material underneath the waterstop configuration for providing a supported parallel surface for welding. The recessed channel keeps dirt and debris from entering the weld area and allows the excess melted thermoplastic material, when compressed, to uniformly squeeze out of the weld area around the joint forming a void free monolithic weld throughout the web of the waterstop.

Other objects, features and advantages of the invention will become readily apparent from a reading of the specification, when taken in conjunction with the drawings, in which like reference numerals refer to like elements in the several views.

DESCRIPTION OF THE PREFERRED EMBODIMENT

Figure 1:
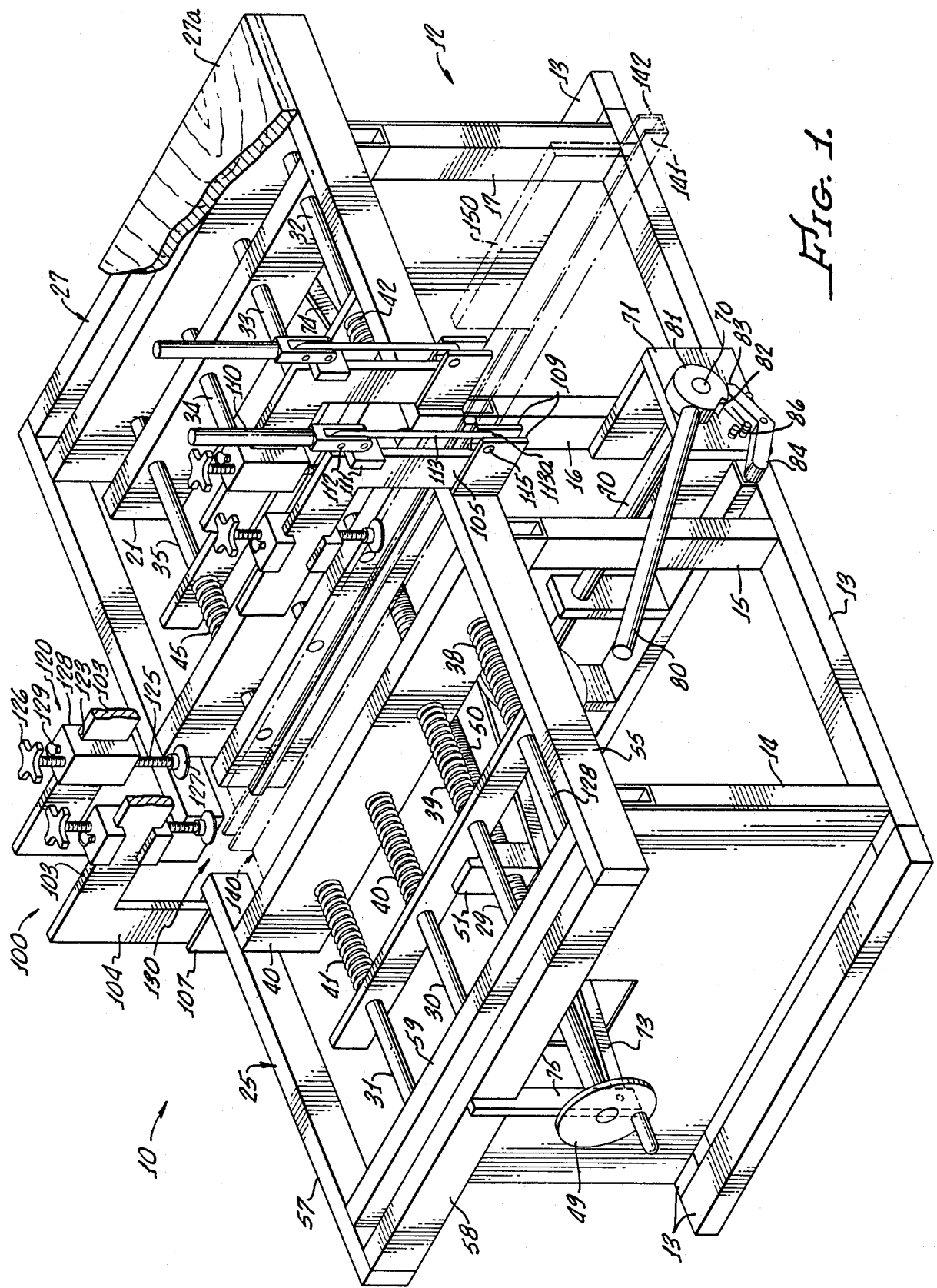
FIG. 1 is a perspective view of the waterstop splicing apparatus according to the invention.
Figure 2:
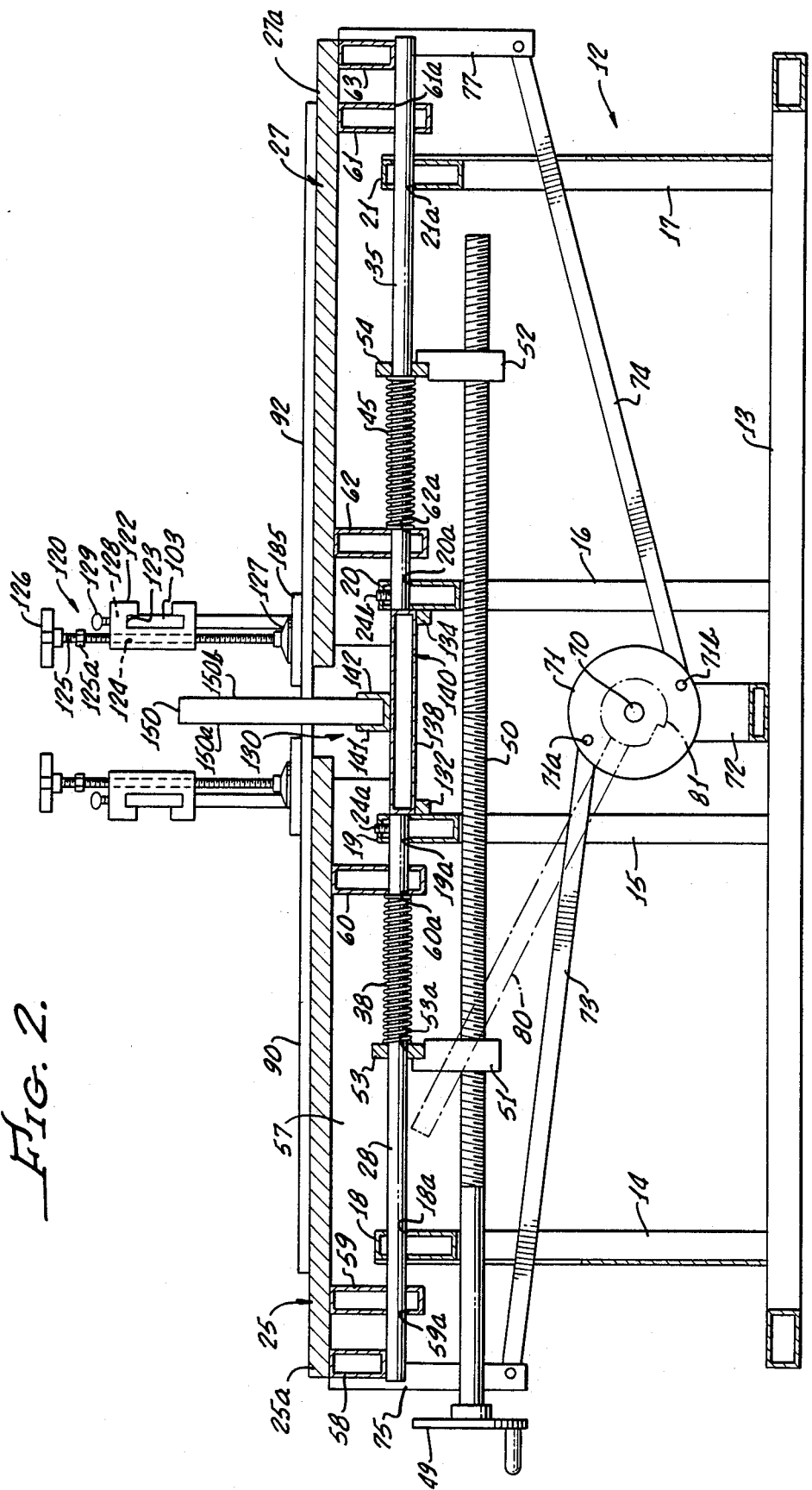
FIG. 2 is a front elevational view of the apparatus of FIG. 1, partially broken away and partially in cross-section, with waterstop clamped thereon for welding.

Referring now to the drawings, and particularly to FIGS. 1 and 2, there is shown the splicing apparatus, generally designated 10, generally in the form of a table assembly of a size sufficient to be transported in the bed of a pickup truck. The apparatus 10 includes support frame 12 for support on a surface, the support frame 12 being formed of four rectangular tubing structural members 13 welded at the ends to form a rectangular support, with like structural uprights 14, 15, 16 and 17 extending upwardly therefrom in spaced aligned pairs and terminating in a common plane (See FIG. 2). It is to be understood that although only four uprights 14-17 are shown, there is an identical arrangement on the opposite side welded to the side members 13.

Intersecting the upper ends of the pairs of uprights 14-17 are cross-beams 18, 19, 20 and 21, with cross-beam 18 welded to the upper ends of upright 14 and its corresponding upright; cross-beam 19 welded to the upper ends of upright 15 and its corresponding upright, etc. The cross-beams 18, 19, 20 and 21 are parallel to one another and have the upper edges thereof lying in a common plane parallel to the plane of the base support members 13.

As shown, the intermediate uprights 15 and 16 are closely spaced relative to the spacing between uprights 14 and 15 or 16 and 17, with the midpoint between uprights 15 and 16 defining the center of the splicing apparatus 10. As better shown in FIG. 1, the structural cross-beams 18-21 of support frame assembly 12 are each provided with four apertures therein for receiving, in stationary relation thereto, a plurality of aligned equally spaced, generally identical steel rods, which form a slidable coupling means for a left and right table assemblies, generally designated 25 and 27.

The steel slide rods 28-35, eight in number, are arranged in two pairs of four each, with slide rods 28-31 being connected within apertures in the left frame assembly cross-beams 18 and 19, and slide rods 32-35 being connected within apertures in right frame cross-beams 20 and 21.

Briefly, as will be described more fully hereinafter, the left and right table top assemblies 15 and 27 are slidably coupled to the support lower assembly 12 by means of the slide rods 28-35, with coil springs 38-45 (springs 43 and 44 are not shown and would encircle rods 33 and 34) encircling each of the slide rods 28-35, respectively, for urging the table top assemblies 25 and 27 toward each other uniformly. As will be described, the compression of the springs 38-45 may be simultaneously adjusted by a single manually rotatable screw member 50 which traverses the length of the apparatus 10.

Specifically, the coupling means includes the slide rods 28-35, and, by reference to rod 28 in FIG. 2, the rod 28 is passed through apertures 18a and 19a of cross-beams 18 and 19, respectively, with suitable fastening means, such as lock screw 24a passing through a threaded opening in cross-beam 19 to secure a first end of rod 28 within the aperture 19a, with the end of the rod flush with the surface of cross-beam 19 adjacent the center of the apparatus. Rod 35 is similarly affixed within apertures 20a and 21a, with another lock screw 24b similarly captively retaining the adjacent end of rod 35.

Captively received on the spring compression adjustment screw 50 is a pair of opposing slide block assemblies, which include first and second slide blocks 51 and 52 having threaded openings therethrough for being received on the screw 50. Securely coupled to each slide block 51, 52, is a transversely extending slide block cross-member 53 and 54, respectively, each of which is provided with four openings therethrough in spaced alignment, and of a diameter sufficient for receiving a slide rod 28-35 therethrough, in slidable relation.

The table top assemblies 25 and 27 are symmetrically arranged and generally identically dimensioned an configured. Each assembly includes a frame with a table top 25a, 27a, secured thereto, the table tops 25a, 27a preferably being formed of a nailable material, such as plywood or composition board. Table top assembly 25 includes a peripheral open framework formed of box-shaped generally hollow metal structural members and, as shown in FIG. 1, is formed of two side rails 55, 57, with an end rail 58 interconnecting the outer edges thereof. A first cross rail 59 is in spaced, parallel proximate relation to end rail 58, and, as shown in FIG. 2, the width or depth thereof is greater than that of rail 58 to depend below the lower edge of rail 58. A second cross rail 60 extends between the inner surfaces of side rails 55 and 57 in offset relation to the opposite ends thereof, and in parallel relation to the rail 59. The cross rail 60 has the same cross-sectional dimension as cross-rail 59, and is suitably secured, such as by welding. As shown in FIG. 2, the lower edge thereof terminates in planar alignment with the lower edge of rail 59, the two rails 59 and 60 forming part of the coupling means. Each of the rails 59 and 60 is provided with a plurality of aligned openings, such as openings 59a and 60a (See FIG. 2), which are of a diameter sufficient for receiving therethrough, in slidable relation, the slide rods 28-31.

The table top assembly is similarly configured, in mirror image relation, with corresponding cross rails 61 and 62 and end rail 63, with cross rails 61 and 62 provided with apertures, such as apertures 61a and 62a for slidably receiving therethrough the slide rods 32-35.

As shown in FIGS. 1 and 2, the table top assemblies 25 and 27 are slidably retained relative to the support frame 12. By reference to FIG. 2, and by reference to one slide rod 28 and one spring 38, the slide rod 28 is inserted through aperture 59a of cross rail 59 of table top assembly 15, and thereafter passed through aperture 18a of the support frame 12. The rod 59 is then passed through an opening 53a of slide block cross-member 53, whereupon a coil spring 38 is placed on the rod 59. The end of rod 59 passes through the spring 38, through the aperture 60a of cross rail 60 of the table top assembly 25 and into the opening 19a of of cross-beam 19 of the frame 12, whereupon the end of rod 28 is secured, such as with lock screw 24a.

The adjustment screw 50 passes through the threaded openings of slide blocks 51 and 52, and is provided with a manually rotatable handle mechanism 49. It is to be understood that the left half of screw 50 is provided with a thread which is opposite to the right half thereof, although equal in pitch, to enable simultaneous, equal and opposite movement of slide blocks 51 and 52, to thereby uniformly and equally adjust the compression of the springs 38-45 encircling rods 28-35, respectively. Once adjusted, the slide blocks 51 and 52 thereafter remain stationary relative to the support frame 12, and movement of the table top assemblies 25 and 27 are effected under force of the bias, or against the force of the bias, of the compression coil springs 38-45.

To effect relative movement of the table top assemblies, a manually operable mechanism is provided, such mechanism including a crankshaft 70 rotatably supported by bearing blocks 71 and 72 secured to the support frame 12, the crankshaft 70 extending across the width thereof, at the lateral centerline thereof. Secured adjacent the midpoint of the crankshaft 70 is a crank member 71 in the form of a disk having a pair of diametrically aligned pivot openings 71a and 71b therethrough. First and second generally identically dimensioned crank arms 73 and 74 have the first ends thereof pivotally coupled within openings 71 and 71b, respectively, with the other ends thereof pivotally coupled to operating arms 75 and 77 of table top assemblies 25 and 27, respectively. The operating arms 25 and 27 are affixed in aligned relation, adjacent opposite ends of the assemblies 25 and 27 in depending relation to the middle of end rails 58 and 63, respectively. Adjacent the front end of the support frame 12, the crankshaft 70 is provided with an operating lever 80 inserted through a disc member 81 coupled to the shaft 70. The disc member 70 is provided with a sear notch 82, which coacts with the pawl 83 of an adjacent pivoted spring loaded hold open lever 84, the purpose of which will be described hereinafter.

To effect separation of the table top assemblies 25 and 27, the operating lever 80 is rotated counterclockwise, as viewed in the drawings, against the force of the coil springs 38-45. During this movement, with the slide blocks 51 and 52 stationary, by reference to FIG. 2, the table top assemblies 25 and 27 are urged outwardly from one another. The lateral movement of the inner cross rails 60 and 62 urge against their respective spring sets 38-41 and 42-45, thereby compressing the springs. To maintain the table top assemblies separated, the notch 82 in the lever disc 81 is engaged by a pawl 83, when the hold open lever 84 is urged counterclockwise against the force of its spring 86, as depicted in FIG. 1. The normal bias of spring 86 is to urge the lever 84 and pawl 85 away from the peripheral surface of the disc 81 to enable the table top assemblies to close under force of the spring arrangements when the operating lever 80 is manipulated slightly to permit self-disengagement of the pawl 83 from the sear notch 82.

To enable captive retention of waterstop strips 90 and 92 on the table tops 25a and 27a, the apparatus 10 is provided with clamp assemblies, generally designated 100 and 102 adjacent the facing edges of the table tops 25a and 27a. The clamp assembly 100 for the left table top assembly 25 includes an inverted generally U-shaped bar means having a transverse bar member 103 normally in a position generally parallel to the table top 25a, with first and second vertically disposed bar portions 104 and 105 integrally secured thereto, such as by welding. The transverse bar member 103 is formed from an elongate plate-like member with the wide dimension thereof extending in a plane perpendicular to the plane of the table top 25a. The vertical bar portion 104 is pivotally secured to a pair of spaced flange members 107 secured to and extending laterally from side rail 57 of assembly 25. The other bar portion 105 depends down into a pair of spaced flanges 109, secured to and laterally extending from side rail 55 of assembly 25.

The clamp assembly 100 is pivotable about bar portion 104 about the axis of pivoting through flanges 107, with the bar portion 105 being dimensioned and configured for being suitably secured within flanges 105 by a clamp assembly locking mechanism, which includes a pivotable lock arm 110 pivotally secured to a pivot plate 111 which is secured adjacent the upper end of bar portion 105. The lock arm 110 is forked at the pivoted end thereof and provided with an offset shaft 112 extending through the forked portion, the shaft 112 pivotably receiving therein one end of a locking rod 113, the engaged end being formed as a loop for retention on the shaft 112. The other end 113 of locking rod 113 is formed into a hook which is configured for engagement with a lock pin 115 extending through the space between adjacent flanges 109. For release of the clamping assembly 100, the lock arm 110 is pivoted downwardly as illustrated in FIG. 1, which disengages the hook end 113a of locking rod 113, after which the assembly 100 may be pivoted toward the rear of the table top assembly 25 to a vertical position. After placement and positioning of the waterstop strips 90 and 92 thereon, the clamp assembly 100 is pivoted in the opposite direction with the hook end 113a of locking rod 113 engaging the lock pin 115, whereupon lock arm 110 is then pivoted upwardly to the vertical position shown to lock the clamp assembly 100 in the position shown.

The other clamp assembly 102 is virtually identically configured, with the two clamp assemblies 100 and 102 being in proximate relation adjacent the proximate facing edges of table tops 25a and 27a. Slidably retained o the transverse bar member 103 are a plurality of clamping devices, generally designated 120 (See also FIGS. 3-5). Each clamping device is identical, and a description of one of them will suffice. The clamping device 120 includes a clamp block 122, which is an enlarged cubically configured block member with a transversely extending, generally T-shaped slot 123 cut therein, the dimensions of slot 123 being sufficient for enabling the block 120 to be slidably received on the transverse bar 103. A threaded aperture 124 extends in a direction transverse to the direction of slot 123 at the approximate midpoint of block 120 for receiving therein a threaded member 125, which has a handle 126 secured to the upper end thereof and a clamp foot 127 rotatably secured to the lower end thereof. In alignment with the slot 123, there is a second threaded opening 128, through which passes a thumbscrew 129 for captively retaining the clamping device 120 in position on bar member 103, once positioned.

Referring now to FIGS. 1 and 2, and particularly to FIG. 1, as can be seen, there is a space 130 between adjacent edges of the coplanar table tops 25a and 27a. Beneath the level of the tops 25a and 27a the facing cross-beams 19 and 20 of frame support 12 are provided with aligned ledge members 132 and 134 spaced a slight distance below the upper edges of cross-beams 19 and 20, the distance being sufficient for forming square corners for receiving a base portion 138 of a removable channel assembly, generally designated 140 (shown in dotted lines). The base portion 138 lies in a plane generally parallel to the plane of the table tops 25a and 27a, and is snugly received between cross-beams 19 and 20 while resting on ledges 132 and 134. A channel guide means is formed on the base portion 138 by a pair of upwardly extending spaced guide flanges 141 and 142, the center of which bisects the base portion 138 along the longitudinal centerline thereof. The length of the channel assembly 140 and the base portion 138 is sufficient to reach all usable areas of the table, plus an additional distance sufficient to permit retraction of the heating iron 150 from a position between the adjacent edges of the table tops 25a and 27a.

Received within the channel formed by the guide flanges 141 and 142 is the heating iron 150, which is of a height sufficient to extend from within the guide channel to a position above the height of the plane of the table tops 25a and 27a. The width of the heating iron 150 is sufficient to be closely received within the channel between flange 141 and 142, with the height of the channel guide flanges 141 and 142 sufficient to maintain the heating iron in generally perpendicular relation to the base portion 138, and consequently, to the plane of the table tops 25a and 27a. The length of the heating iron 150 is longer than the edge of the waterstop members 90 and 92 to be joined or spliced. The opposing heating surfaces 150a and 150b of heating iron 150 may be suitably coated with a Teflon composition to facilitate cleaning and prevent sticking f the plastic material during use.

In operation of the apparatus 10, the waterstop 90 and 92 ends are precut, such as by use of a radial arm saw, to the correct length and angles to assure that the edges are squared. Then the operating lever 80 is depressed all the way down, thus separating the table top assemblies outwardly to the maximum distance. With the operating lever 80 depressed, the channel assembly 140 is positioned on ledges 132 and 134, and slid inwardly until it stops at an appropriate working distance in the space 130. Suitable stop means (not shown) are be provided to readily limit the insertion of the channel assembly 140 so that a portion thereof protrudes forwardly a distance sufficient to enable retraction of the heating iron 150 out of the space between adjacent table tops 25a and 27a during operation.

At this point, the operating lever 80 is released to allow the table top assemblies 25 and 27 to close under force of the spring arrangements. The locking rods 113 are released by actuation of lock arms 110 to swing the clamping assemblies 100 and 102 to a vertical position. The operating lever 80 is then depressed again to open the table top assemblies 25 and 27 an equal distance, at which point, the hold open lever 84 is depressed until it engages with the sea notch 82 in the disc 81. By slowly releasing the operating lever 80, the table top assemblies 25 and 27 are permitted to advance toward each other, until they are a fixed distance apart of approximately one inch, that is, the space 130 is about one inch, forming a gap across the width of the table top assemblies 25 and 27. Upon a subsequent actuation of the operating lever 80, the spring loaded hold open lever 84 will open to clear the sear notch 82, thus allowing the table top assemblies 25 and 27 to close completely.

At this point, the precut thermoplastic waterstop strips 90 and 92 are positioned on the table tops 25a and 27a, one on each table top, near the center of the gap or space 130. Beginning with the strip 90 on the left, the strip 90 is positioned so that the edge to be welded is directly in the middle of the gap 130 created by the hold open lever 84. (As will be discussed in connection with FIGS. 3 through 8, a selection of a particular type of clamp foot 127 is made in accordance with the cross-sectional configuration of the waterstop to be welded.) Correspondingly, at this point, a decision will be made as to the need for, configuration of, and placement of shim stock. In some instances, it will be desirable to place shim stock beneath the waterstop to support the material and prevent distortion, and for this purpose the table tops 25a and 27a are made of material into which nails may be driven.

At this point, after the waterstop strip 90 is positioned with the edge bisecting the space 130, the first clamping assembly 100 is pivoted from its vertical position toward the table top 25a. Prior to securing the clamping assembly 100, one or more of the clamping devices 120 are slidably moved along bar 103 to a position where the clamp foot 127 (or clamp feet) is directly over the desired clamping position. The clamp device 120 is then locked in position by tightening the thumbscrew 129 of the slidable clamp block 122. Thereafter, the lock rod 113 has the hook end thereof engaging the lock pin 115, after which the lock arm 110 is pivoted upwardly to a locking position.

Then, the clamping pressure is adjusted by turning the adjustment knob 126 located on the top of the clamp device 120 to provide firm, yet non-deforming pressure. The device 120 is then secured by tightening the lock nut 125a located on the threaded rod 125 under the adjustment knob 126.

This procedure is then repeated for the right side, that is the placement and positioning of the waterstop strip 92 on the table top 27a, with the edge thereof in edge abutting aligned relation to the edge of the waterstop strip 90. After shimming, if needed and clamping, the operating lever 80 is depressed to separate the table top assemblies 25 and 27.

With the lever 80 depressed, the preheated thermoplastic splicing iron 150, which is positioned in the recessed channel assembly 140, is moved from its retracted position to a position centrally located between the two pieces 90 and 92 of thermoplastic waterstop strips 90 and 92. It is again emphasized that the heating iron is of a length in the direction of the channel greater than the maximum dimension of edge to be spliced. The operating lever 80 is slowly released until all the table pressure from the compression springs 38–45 is being applied to the thermoplastic waterstop strips 90 and 92 against the opposing surfaces of the heating iron 150. As the plastic material begins to melt, it is observed to determine the rate of melt for the particular temperature. If the rate of melt is too slow, spring tension may be increased simultaneously and uniformly on both sides of the apparatus 10 by rotation of the spring adjustment crank handle 49, until a satisfactory rate of flow is achieved. Conversely, if the rate of melt is too high, spring tension may be decreased. Caution must be exercised when adjusting spring tension, inasmuch as over tightening of the spring tension may cause the plastic edges to curl up at the face of the iron 150, resulting in a beveled edge. During this heating, the iron 150 remains stationary, with each edge of strips 90 and 92 receiving equal heat and being under equal pressure toward the opposing heating surfaces 150a and 150b to assure uniform melting on both edges.

When an approximate 3/16 inch bead of semifluid edges is observed, the operating lever 80 is depressed to separate the opposing edges of the waterstop strips 90 and 92 from the iron 150. The iron 150 is then retracted along the channel assembly 140 to a position clear of the table top assemblies 25 and 27. The operating lever 80 is now slowly released, closing the table top assemblies 25 and 27, under force of the compression springs 38–45, thus joining the plastic semifluid edges of strips 90 and 92. Again, during this fusion process, equal pressures are applied to both edges in opposite directions, that is, toward each other, to promote even flow and a homogeneous, monolithic weld.

After the plastic weld has cooled, the spliced fitting is removed from the table tops 25a and 27a by holding the operating lever 80 in position, then pulling the left lock arm 110 down to release the hook 113a from lock pin 115. The clamping assembly 100 is then pivoted to its vertical position. The operating lever 80 is then depressed slightly to engage the sear notch 82 and the hold open lever 84 is depressed to engage the sear. Thereafter, the right side clamp arm assembly 102 is released and the spliced fitting is removed.

Figure 3:
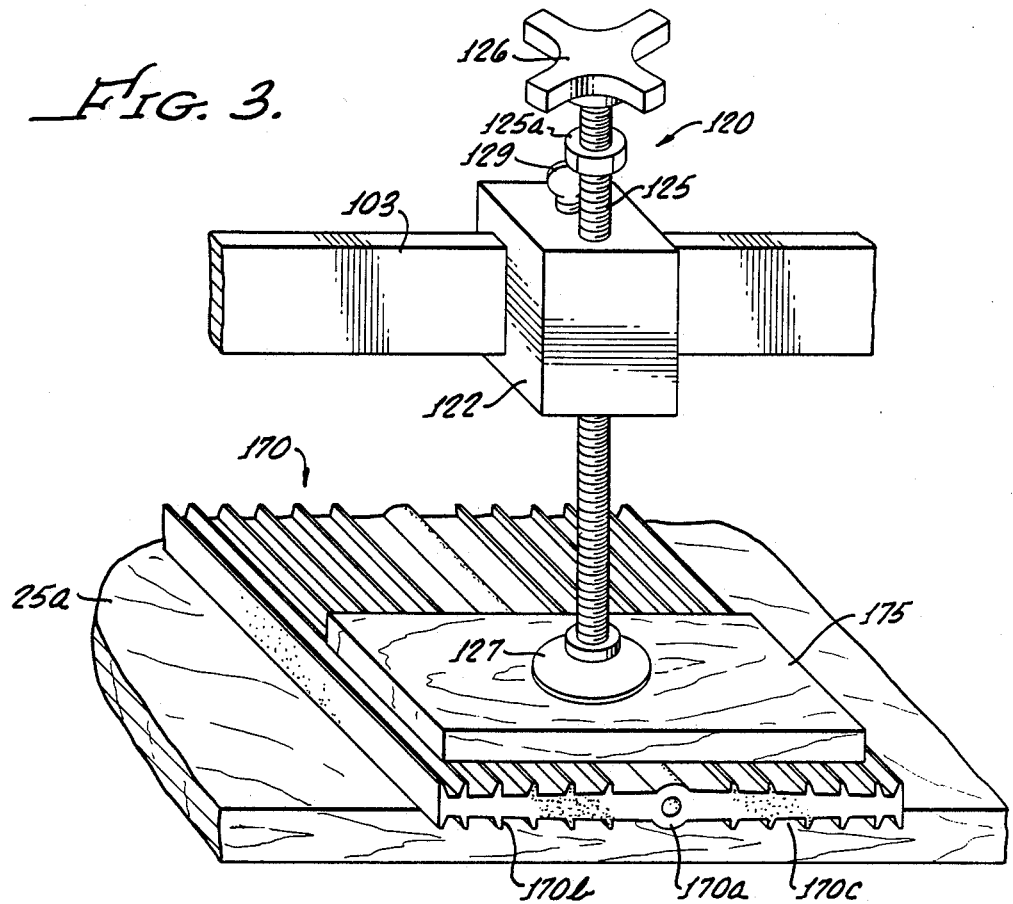
FIG. 3 is an enlarged perspective view of a portion of the apparatus of FIG. 1 illustrating a clamping device retaining a section of a first waterstop member on the table surface thereof.
Figure 4:
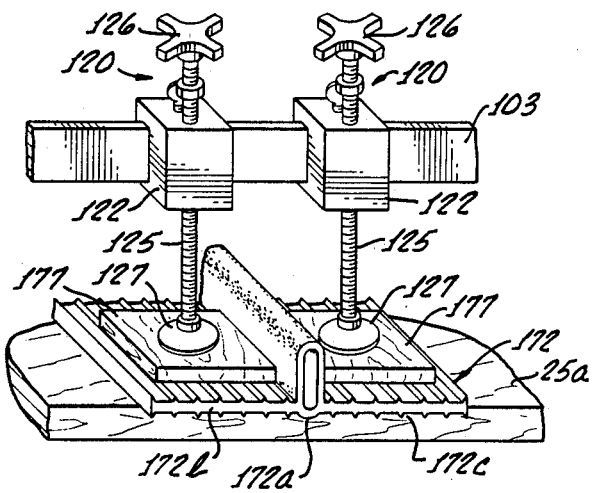
FIG. 4 is an enlarged perspective view of a portion of the apparatus of FIG. 1 illustrating a clamping device retaining a section of a second waterstop member on the table surface thereof.
Figure 5:
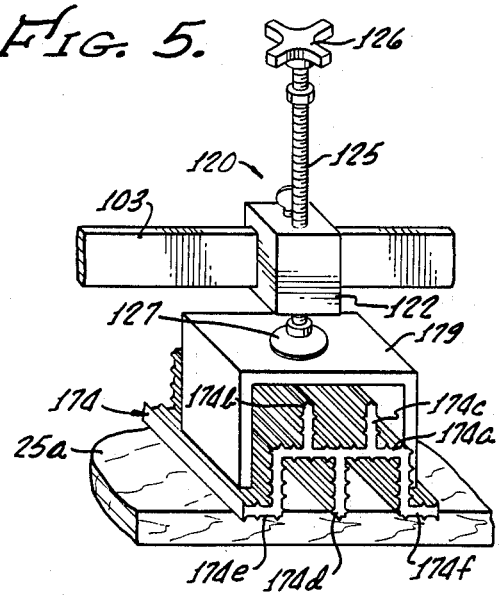
FIG. 5 is an enlarged perspective view of a portion of the apparatus of FIG. 1 illustrating a clamping device retaining a section of a third waterstop member on the table surface thereof.

Referring now to FIGS. 3 through 5, there are shown different clamp feet and waterstop strips of different cross-sectional configuration, and, for example, in FIG. 3, there is shown a waterstop strip 170, wherein the cross-section includes a tubular portion 170a extending the length of the strip, with side portions 170b and 170c extending laterally therefrom, each of the side portions being generally plate shaped with a plurality of equally spaced transversely disposed ribs extending from opposite surfaces thereof. In this instance, a wooden shim 175 is placed between the clamp foot 127 and the table top 25a to generally uniformly distribute the clamping pressure over a broad surface in proximity to the edge of the strip 170.

FIG. 4 depicts a strip 172 of another cross-section, in which the core or longitudinal center thereof includes an ovate tubular portion 172a, and transversely extending ribbed side portions 172b and 172c, in which one surface thereof (the lower surface a depicted in the drawing) has the ribs thereof and the adjacent lower edge of the tubular portion 172a in generally coplanar alignment. For this configuration, two clamping devices 120 are utilized, one being placed generally centrally relative to the width of the side portions 172a and 172b, that is, each clamping device 120 is equidistant from the longitudinal centerline of the strip 172. A shim 177 is placed under each clamp foot 127, with each shim having a generally rectangular dimension, with a width of sufficient dimension in the direction transverse to the direction of the tubular portion 172a, to enable proper distribution of pressure without deforming or puncturing the thermoplastic material. In FIG. 5, there is a waterstop strip 174, the cross-section of which is multi-flanged channel shaped, with a C-shaped channel portion 174a, the bight portion of which has a pair of upwardly (as viewed in the drawing) extending flanges 174b and 174c and a centrally disposed downwardly extending flange 174d, with smaller laterally outwardly extending flanges 174e and 174f, defining a common plane, along with the lower edge of flange 174d, this common plane being placed on the table top 25a. An inverted, generally U-shaped clamp member 179 has an internal dimension sufficient to receive the main part of the strip 174 therein with the depending lower ends of the clamp member 179 engaging the laterally extending flanges 174e and 174f, with the upper surface of the bight portion of the clamp member 179 being engaged by the clamp foot 127 to thus apply pressure to the strip 174. In some instances, the cross-section of the waterstop may be such that shims are need beneath the surface of the waterstop at the point of clamping, that is between a portion thereof and the surface of the table top 25a. In such cases, shims of appropriate dimension and configuration may be readily nailed to the surface of table top 25a in proximate relation to the edge of the strip for distribution of clamping pressure without deformation of the material.

Figure 6:
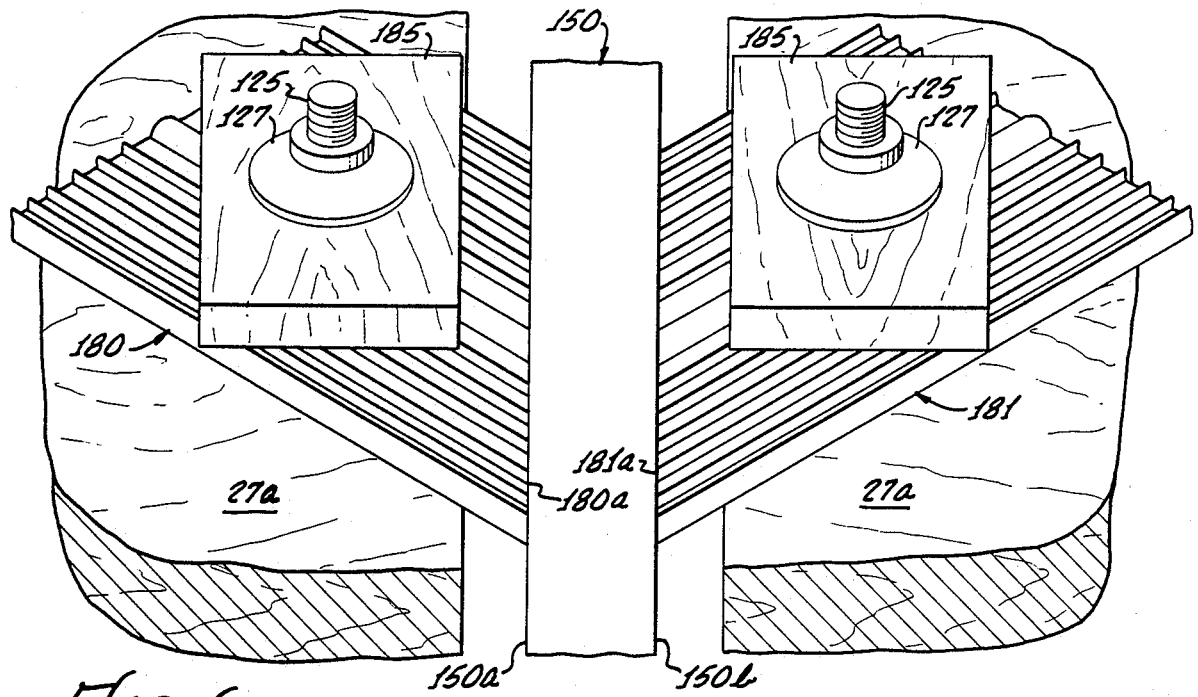
FIG. 6 is an enlarged perspective view of a portion of the apparatus of FIG. 1 illustrating a clamping device retaining two sections of beveled waterstop members on the table surface thereof with the heating iron in contact with both surfaces preparatory top forming a corner section.
Figure 7:
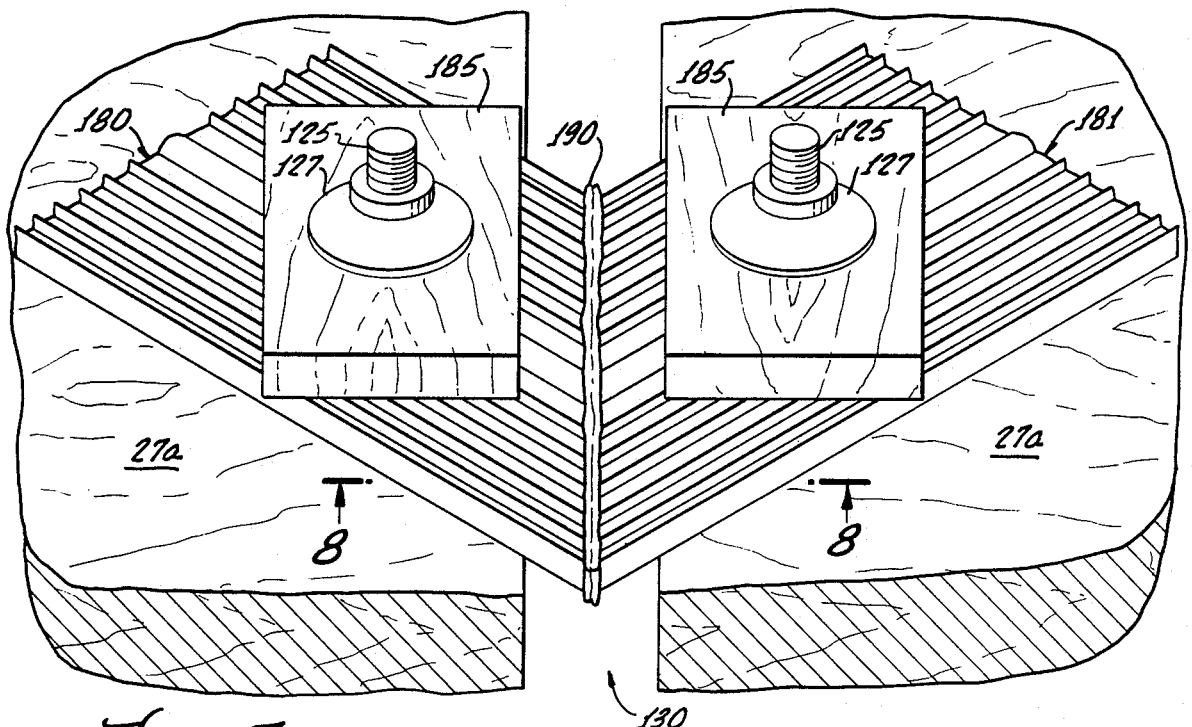
FIG. 7 is an enlarged perspective view similar to FIG. 6 with the heating iron removed and the heated ends in juxtaposed relation.
Figure 8:
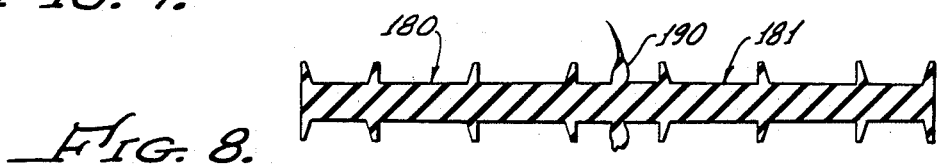
FIG. 8 is a cross-sectional view of the waterstop members of FIGS. 6 and 7 welded together to show the monolithic nature of the weld.

As shown in FIGS. 6 and 7, mitered joints may be readily formed in the field with the apparatus according to the present invention. The adjacent edges 180a and 181a of the respective waterstop strips 180 and 181 are precut to the desired angle, in this instance forty-five degrees. This cutting is preferably done in some controllable manner to insure a true edge, that is, that the cut edge lies in a plane generally perpendicular to a common plane through the lateral dimension of the strip. A radial arm saw will readily accomplish such a cut. The two strips 180 and 181 are suitably clamped to the table tops 25a and 27a with the shims 127 in proximate relation to the edges to be spliced. In the position shown, the strips 180 and 181 have been secured in place with the tables apart, as previously described, the heating iron 150 has been moved down the channel assembly 140 (See FIG. 2) to a position where the opposing iron surfaces 150a and 150b are in full contact with the edges 180a and 180b, respectively, with the table tops 251 and 27a released under force of the springs to provide equal pressure of both edges 180a and 181a against the surfaces 150a and 150b.

After proper flow is observed, the table tops 25a and 27a are moved apart, whereupon the iron 150 is slid along the channel assembly 140 to a position retracted from the space 130, after which the table tops 25a and 27a are moved together to enable edges 180a and 181 to move into abutting relation, again under force of the springs, until the weld joint 190 is cooled. As shown in cross-section in FIG. 8, the result is a monolithic weld, in which the weld joint 190 exhibits the same homogeneous characteristics of the balance of the material of the strips 180 and 181, with no voids or cavities.

In accordance with the present invention, consistent results are obtainable with edge butting on right angled edges or beveled edges at any angle. By providing equal pressure on both strips during heating, and by providing equal pressure from both sides during splicing and cooling, homogeneous welds or splices are achievable. Unlike the prior art, the heating iron 150 remains stationary during the heating, thereby providing even distribution of heat along the abutting waterstop edges, and uniform melting to the same depth on both edges. The iron 150 is not moved along the edges which might tend to distort the edges, and which might result in uneven application of heat along the edges. Furthermore, prior to retraction of the heating iron 150, the strips are moved away from the now melting edges and then moved back into abutting relation after retraction of the iron 150, with both edges approaching the midpoint of the gap or space 130 at equal speeds and with equal pressure for coaction and fusion.

With the channel assembly 140 removable and recessed at the middle of the assembly, the heating or welding iron 150 is supported with the lower edge thereof recessed. The recessed guide flanges 141 and 142 of the channel assembly 140 keeps dirt and debris from entering the weld area and allows the excess melted thermoplastic material, when compressed, to uniformly squeeze out of the weld area around the joint forming a void free weld throughout the web of the waterstop. Furthermore, with the channel assembly 140 extending out from the space 130, the iron 150 is moved along the channel out of the wa during the final fusion or welding process. While the weld cools, the channel supports the iron 150 to enable the operator to clean the surfaces of melted thermoplastic residue. While there has been shown and described a preferred embodiment, it is to be understood that various other adaptations and modifications may be made within the spirit and scope of the invention.

What I claim is:

1. Apparatus for use in splicing together the ends of a pair of elongated strips of thermoplastic waterstop, or the like, comprising:
   support frame means;
   first and second table means having, respectively, first and second generally planar surfaces for receiving thereon said strips;
   means for coupling said first and second table means to said support frame means in substantially coplanar relation while enabling simultaneous and opposite movement of said first and second table means and for providing a space between adjacent edges of said table means;
   spring means interoperatively engaging said support frame means and each of said first and second table means for generally uniformly urging each of said first and second surfaces toward one another;
   clamp means on each of said first and second table means in proximate relation to one another and to said space, said clamp means enabling the clamping of a strip on each of said first and second surfaces with the strip ends to be welded in facing generally parallel aligned relation;
   channel guide means supported by said support frame means below said space and generally centrally relative thereto, said channel guide means defining a path generally parallel to the plane of said coplanar surfaces;
   a separate manually insertable and removable heating member having first and second generally parallel heating surfaces, said heating member being configured for sliding movement within said channel guide means between a first position outside the area of said table means and a second position within a space between the table means intermediate opposing facing ends of the strips; and
   first and second manually operable means selectively operable for urging said first and second table means apart, the combined and selective operation of said first and second manually operable means, in conjunction with the bias force of said spring means enabling placing of said strips with the ends thereof in aligned relation on said table means, urging said first and second table means toward one another, urging the adjacent strip ends together toward opposite surfaces of said heating iron means, separating said first and second table means for subsequent removal of said heating member and uniformly urging the thus heated strip ends into juxtaposition thereafter for enabling the welding of said ends together.

2. The apparatus according to claim 1 wherein said clamp means includes first and second bar means in spaced parallel relation to said first and second coplanar surfaces in proximate relation to said edges thereof, and a plurality of clamp devices on each of said bar means, said clamp devices being slidable and lockable relative to said bar means for enabling adjustable positioning thereof for retaining the adjacent strip ends in proximate relation on said surfaces.

3. The apparatus according to claim 2 wherein said spring means includes a generally identical arrangement of a plurality of generally identical spring members for each of said first and second table means.

4. The apparatus according to claim 3 further including means for simultaneously adjusting the bias force of all of said spring members to provide equal spring force for each of said table means.

5. The apparatus according to claim 4 wherein each of said bar means is pivotably coupled to its respective table means.

6. Apparatus for use in splicing together the ends of a pair of elongated strips of thermoplastic waterstop, or the like, comprising:
   table means including first and second aligned coplanar table surfaces having spaced facing edge portions;
   means for simultaneously and equally displacing said first and second table surfaces in mutually opposite directions relative to one another;

separate manually positioning heating iron means having parallel opposing surfaces;

channel means beneath said table means and generally centrally positioned relative to said spaced facing edge portions, said channel means being dimensioned for enabling manual displacement of said heating iron means therein to a position with opposing surfaces thereof aligned for engagement with facing ends of said pair of strips;

first and second clamp means on said first and second table surfaces, each of said clamp means being positioned in proximate relation to the edge portion of the respective table surface for retaining one of said strips on the respective one of said surfaces, each of said clamping means including bar means in spaced aligned relation to said surfaces and having a plurality of clamping devices slidably retained thereon, each of said clamping devices having a clamp foot positionable at about the edge portion of the respective table surface for clampingly engaging the strip in proximate relation to the end thereof;

spring means interoperatively engaging said displacing means for biasing said first and second table surfaces toward one another for enabling the application of uniform simultaneous pressure while urging the adjacent strip ends together toward opposite surfaces of said heating iron means and for uniformly urging the thus heated strip ends into juxtaposition thereafter for enabling the welding of said ends together; and manually operable means in interoperative engagement with said displacing means for urging said first and second table surfaces apart, the combined and selective operation of said manually operable means, in conjunction with the bias force of said spring means, enabling placing of said strips with the ends thereof in aligned relation on said table surfaces, separating said first and second table surfaces, urging the adjacent strip ends together toward opposite surfaces of said heating iron means, separating said first and second table surfaces for subsequent removal of said heating member and uniformly urging the thus heated strip ends into juxtaposition thereafter for enabling the welding of said ends together.

7. The apparatus of claim 6 further including shim means selectable for interposition between at least one of a strip and a table surface and a strip and a clamp foot, said shim means enabling the retention of the facing ends of said strips in generally parallel relation with said clamp means clamping said strips to said surfaces.

8. The apparatus according to claim 6 wherein said clamp means includes first and second bar means in spaced parallel relation to said first and second coplanar surfaces in proximate relation to said edge portions thereof, and a plurality of clasp devices on each of said bar means, said clamp devices being slidable and lockable relative to said bar means for enabling adjustable positioning thereof for retaining the adjacent strip ends in proximate relation on said surfaces.

9. The apparatus according to claim 8 wherein said spring means includes a generally identical arrangement of a plurality of generally identical spring members for each of said first and second table surfaces.

10. The apparatus according to claim 9 further including means for simultaneously adjusting the bias force of all of said spring members to provide equal spring force for each of said table surfaces.

11. The apparatus according to claim 10 wherein each of said bar means is pivotably coupled to its respective table surface.

12. Apparatus for use in splicing together the ends of a pair of elongated strips of thermoplastic waterstop, or the like, comprising:

support frame means;

first and second table means, each having a generally planar surface for receiving said strips thereon;

means for coupling said first and second table means to said support frame means with said surfaces in coplanar relation, said coupling means enabling simultaneous and opposite movement of said first and second table means with a space formed therebetween as said first and second table means move apart;

spring means interoperatively engaging said support frame means and each of said first and second table means for generally uniformly urging each of said first and second table means toward one another;

clamp means on each of said first and second table means in proximate relation to one another and to said space, said clamp means enabling the clamping of a strip on each of said first and second surface with the strip ends to be welded in facing generally parallel aligned relation;

a separable heating member having first and second generally parallel heating surfaces;

channel means supported by said support frame means below said space and generally centrally relative to said space, said channel means being in generally parallel relation to the coplanar surfaces of said table means and configured for slidably receiving said heating member therein for selective manual placement into and out of said space intermediate opposing facing ends of the strips;

first manually operable means for urging said first and second table means apart against the force of said spring; and second manually operable means positionable from an inoperative position to an operative position in interoperative engagement with said first manually operable means for fixedly and temporarily positioning said first and second table means apart to form a space of a predetermined distance, combined selective operation of said first and second manually operable means in conjunction with said spring means enabling (a) placing and clamping of said strips into edge abutting aligned relation on said first and second table means with said second manually operable means in the operative position;

(b) separation of said table means upon actuation of said first manually operable means with said second manually operable means in the inoperative position for enabling sliding manual placement of said heating member in the space between the facing ends of said strips;

(c) release of said first and second table means with said second manually operable means in the inoperative position and said first manually operable means gradually released for enabling movement of said table means toward each other under force of said spring means for urging said first and second table top means toward one another and for urging the adjacent strip ends together toward opposite surfaces of said heating iron means;

(d) subsequent separation of said first and second table means along with the strips clamped thereto upon actuation of said first manually operable means with said second manually operable means inoperative for enabling sliding manual removal of said heating member from the space between said first and second table means; and (e) subsequent release of said first and second table means with said second manually operable means inoperative and said first manually operable means gradually released for enabling movement of said table means toward each other under force of said spring means for uniformly urging the thus heated strip ends into juxtaposition thereafter for enabling the welding of said ends together.

13. The apparatus according to claim 12 wherein said spring means includes a generally identical arrangement of a plurality of generally identical spring members for each of said first and second table means.

14. The apparatus according to claim 13 further including means for simultaneously adjusting the bias force of all of said spring members to provide equal spring force for each of said table means.

15. Apparatus for splicing together the ends of a pair of elongated strips of thermoplastic waterstop, or the like, said apparatus comprising:

two coplanar surfaces with a space therebetween;

means for clamping each of said strips to its respective surface with the ends thereof to be spliced in aligned facing proximate relation, said means for clamping including first and second bar means in spaced parallel relation to said first and second coplanar surfaces in proximate relation to said space, and a plurality of clamp devices on each of said bar means, said clamp devices being slidable and lockable relative to said bar means for enabling adjustable positioning thereof for retaining the adjacent strip ends in proximate relation on said surfaces;

separate manually positionable heating iron means;

means for enabling positioning of said heating iron means generally centrally within said space and generally centrally relative to the length of the ends to be spliced, said heating iron means having a length at least equal to the length of the ends to be spliced, and said means for positioning including means for retracting said heating iron means out from said space;

bias means for urging said surfaces toward each other simultaneously and equally under uniform and generally equal pressure; and manually operable means for moving said surfaces apart form each other simultaneously and equally, operation of said manually operable means, in conjunction with said bias means enabling separation of said surfaces with said strips clamped thereon, insertion of said heating iron means, application of uniform simultaneous pressure while urging the adjacent strip ends together toward opposite surfaces of said heating iron means, subsequent separation of said surfaces, removal of said heating iron means and uniform urging of the thus heated strip ends into juxtaposition thereafter for enabling the welding of said ends together.

16. The apparatus according to claim 15 wherein each of said bar means is pivotably coupled to its respective coplanar surface.

17. The apparatus according to claim 15 wherein said means for moving said surfaces toward and away from each other simultaneously and equally under uniform and generally equal pressure includes spring means, said spring means including a generally identical arrangement of a plurality of generally identical spring members for each of said first and second coplanar surfaces.

18. Apparatus for splicing together the ends of a pair of elongated strips of thermoplastic waterstop, or the like, said apparatus comprising:

two coplanar surfaces with a space therebetween;

means for clamping each of said strips to its respective surface with the ends thereof to be spliced in aligned facing proximate relation;

separate manually positionable heating iron means;

means for enabling positioning of said heating iron means generally centrally within said space and generally centrally relative to the length of the ends to be spliced, said heating iron means having a length at least equal to the length of the ends to be spliced, and said means for positioning including means for retracting said heating iron means out from said space;

bias means, including spring means, for urging said surfaces toward each other simultaneously and equally under uniform and generally equal pressure, said spring means including a generally identical arrangement of a plurality of generally identical spring members for each of said coplanar surfaces;

means for simultaneously adjusting the bias force of all of said spring members to provide equal spring force for each of said coplanar surfaces; and manually operable means for moving said surfaces apart from each other simultaneously and equally, operation of said manually operable means, in conjunction with said bias means enabling separation of said surfaces with said strips clamped thereon, insertion of said heating iron means, application of uniform simultaneous pressure while urging the adjacent strip ends together toward opposite surfaces of said heating iron means, subsequent separation of said surfaces, removal of said heating iron means and uniform urging of the thus heated strip ends into juxtaposition thereafter for enabling the welding of said ends together.

* * * * *